United States Patent
Whittle et al.

(10) Patent No.: US 11,162,372 B2
(45) Date of Patent: Nov. 2, 2021

(54) TURBINE VANE DOUBLET WITH CERAMIC MATRIX COMPOSITE MATERIAL CONSTRUCTION

(71) Applicants: Rolls-Royce plc, London (GB); Rolls-Royce North American Technologies Inc., Indianapolis, IN (US)

(72) Inventors: Michael J. Whittle, London (GB); Ted J. Freeman, Danville, IN (US)

(73) Assignees: Rolls-Royce plc; Rolls-Royce North American Technologies Inc., Indianapolis, IN (US)

( * ) Notice: Subject to any disclaimer, the term of this patent is extended or adjusted under 35 U.S.C. 154(b) by 109 days.

(21) Appl. No.: 16/703,366

(22) Filed: Dec. 4, 2019

(65) Prior Publication Data

US 2021/0172327 A1    Jun. 10, 2021

(51) Int. Cl.
*F01D 5/28* (2006.01)
*F01D 5/14* (2006.01)

(52) U.S. Cl.
CPC ............ *F01D 5/284* (2013.01); *F01D 5/282* (2013.01); *F01D 5/147* (2013.01); *F05D 2220/323* (2013.01); *F05D 2230/60* (2013.01); *F05D 2240/12* (2013.01); *F05D 2240/80* (2013.01); *F05D 2300/6033* (2013.01)

(58) Field of Classification Search
CPC .......... F01D 5/284; F01D 5/282; F01D 5/147; F05D 2240/12; F05D 2230/60; F05D 2220/323; F05D 2240/80; F05D 2300/6033
See application file for complete search history.

(56) References Cited

U.S. PATENT DOCUMENTS

| | | |
|---|---|---|
| 6,200,092 B1 | 3/2001 | Koschier |
| 6,648,597 B1 | 11/2003 | Widrig et al. |
| 7,799,405 B1 | 9/2010 | Vance et al. |
| 8,454,303 B2 | 6/2013 | Garcia-Crespo |
| 9,103,214 B2 | 8/2015 | McCaffrey |
| 9,427,834 B2 | 8/2016 | Fremont et al. |
| 9,506,355 B2 | 11/2016 | Nunez et al. |
| 9,752,445 B2 | 9/2017 | Watanabe |
| 10,107,119 B2 | 10/2018 | Walston |
| 10,125,620 B2 | 11/2018 | Alvanos |
| 10,174,627 B2 | 1/2019 | Chang et al. |
| 10,260,362 B2 | 4/2019 | Varney |
| 10,294,807 B2 | 5/2019 | Kington et al. |
| 10,329,950 B2 | 6/2019 | Freeman et al. |
| 2014/0356151 A1 | 12/2014 | Fremont et al. |
| 2015/0003978 A1 | 1/2015 | Watanabe |
| 2015/0003989 A1 | 1/2015 | Uskert et al. |
| 2015/0016972 A1 | 1/2015 | Freeman et al. |

(Continued)

FOREIGN PATENT DOCUMENTS

WO    WO-2014197233 A1 * 12/2014    ............. F01D 9/041

*Primary Examiner* — Jacob M Amick
*Assistant Examiner* — Charles J Brauch
(74) *Attorney, Agent, or Firm* — Barnes & Thornburg LLP

(57) ABSTRACT

The present disclosure is related to turbine vanes comprising ceramic matrix composite materials and vane ring assemblies including the same and adapted for use in gas turbine engines. The turbine vanes each include a platform that defines a gas path of the gas turbine engine and an airfoil that extends away from the platform.

15 Claims, 8 Drawing Sheets

(56) References Cited

U.S. PATENT DOCUMENTS

| | | |
|---|---|---|
| 2016/0215634 A1 | 7/2016 | Walston |
| 2016/0230576 A1 | 8/2016 | Freeman et al. |
| 2017/0009593 A1 | 1/2017 | Watanabe |
| 2017/0226861 A1 | 8/2017 | Evain et al. |
| 2018/0135418 A1 | 5/2018 | Surace |

* cited by examiner

TURBINE VANE DOUBLET WITH CERAMIC MATRIX COMPOSITE MATERIAL CONSTRUCTION

FIELD OF THE DISCLOSURE

The present disclosure relates generally to vanes used in gas turbine engines, and more specifically to vanes incorporating ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that cause the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength desired for their application.

SUMMARY

The present disclosure may comprise one or more of the following features and combinations thereof.

A turbine vane assembly adapted for use in a gas turbine engine may include a first platform, a second platform, a first airfoil unit, and a second airfoil unit. The first platform, the second platform, the first airfoil unit, and the second airfoil unit may each comprise ceramic matrix composite materials.

In some embodiments, the first platform may extend circumferentially partway about an axis to define a first boundary of a gas path of the turbine vane assembly. The second platform may extend circumferentially partway about the axis to define a second boundary of the gas path. In some embodiments, the second platform may be spaced apart radially from the first platform.

In some embodiments, the first airfoil unit and second airfoil unit may each be adapted to interact with gases flowing through the gas path. The first airfoil unit may extend radially relative to the axis between the first platform and the second platform. The second airfoil unit may extend radially relative to the axis between the first platform and the second platform. The second airfoil unit may be spaced apart circumferentially from the first airfoil unit. In some embodiments, the first platform, the second platform, the first airfoil unit, and the second airfoil unit may be integrally formed as a single, one-piece component.

In some embodiments, the first platform may include a radially inwardly facing surface and a radially outwardly facing surface. The radially inwardly facing surface may define the first boundary of the gas path. The radially outwardly facing surface may be opposite the radially inwardly facing surface.

In some embodiments, the radially inwardly facing surface and the radially outwardly facing surface of the first platform may extend continuously circumferentially between a first side wall and a second side wall of the first platform. In some embodiments, the first airfoil unit and the second airfoil unit may be located circumferentially between the first side wall and the second side wall of the first platform.

In some embodiments, the turbine vane assembly may further include a third platform. The third platform may be spaced apart radially from the first platform.

In some embodiments, the second platform may be arranged circumferentially and axially about the first airfoil unit and integrally formed with the first airfoil unit. The third platform may be arranged circumferentially and axially about the second airfoil unit and integrally formed with the second airfoil unit. In some embodiments, the third platform may be located adjacent the second platform along a seam.

In some embodiments, the second platform may include a radially outwardly facing surface and a radially inwardly facing surface. The radially outwardly facing surface may define the second boundary of the gas path. The radially inwardly facing surface may be opposite the radially outwardly facing surface.

In some embodiments, the radially inwardly facing surface and the radially outwardly facing surface of the second platform may extend continuously circumferentially between a first side wall and a second side wall of the second platform. In some embodiments, the first airfoil unit and the second airfoil unit may be located circumferentially between the first side wall and the second side wall of the second platform.

In some embodiments, the first platform may include a plurality of ceramic laminate layers. Each of the plurality of ceramic laminate layers may be formed to define a first airfoil unit-shaped hole and a second airfoil unit-shaped hole. The first airfoil unit-shaped hole may extend radially through the ceramic laminate layer. The second airfoil unit-shaped hole may extend radially through the ceramic laminate layer.

In some embodiments, the first airfoil unit may extend radially through the first hole. In some embodiments, the second airfoil unit may extend radially through the second hole.

In some embodiments, the first airfoil unit may include a vane core and a locking layup. The vane core may extend radially through the first platform and the second platform. The locking layup may include a filler and a core overwrap. The filler may be coupled with the vane core and aligned radially with the first platform. The core overwrap may extend radially along the vane core from a tip of the vane core toward the first platform and may extend along the filler to cause the core overwrap to flare away from the vane core and engage the first platform.

In some embodiments, the first airfoil unit may include an airfoil body. The airfoil body may be located radially between the first platform and the second platform and may be arranged around the vane core.

In some embodiments, the first platform may include a first 3D woven ceramic structure and a 2D sub-laminate layer of ceramic materials. The first 3D woven ceramic structure may be arranged around the first airfoil unit. The 2D sub-laminate layer of ceramic materials may be preformed on the first 3D woven ceramic structure.

In some embodiments, the first platform may include a second 3D woven ceramic structure. The second 3D woven ceramic structure may be arranged around the second airfoil unit. The 2D sub-laminate layer of ceramic materials may be pre-formed on the first and second 3D woven ceramic structures to couple the first 3D woven ceramic structure with the second 3D woven ceramic structure.

According to another aspect of the present disclosure, a turbine vane assembly adapted for use in a gas turbine engine may include a first platform, a first airfoil unit, and a second airfoil unit. The first platform, the second platform, the first airfoil unit, and the second airfoil unit may each comprise ceramic matrix composite materials.

In some embodiments, the first platform may extend circumferentially partway about an axis between a first side wall and a second side wall. The first platform may extend circumferentially between the first and second side walls to define a boundary of a gas path of the turbine vane assembly.

In some embodiments, the first airfoil unit may be coupled with the first platform between the first side wall and the second side wall. The second airfoil unit may be coupled with the first platform between the first side wall and the second side wall. The second airfoil unit may be spaced apart circumferentially from the first airfoil unit. In some embodiments, the first platform, the first airfoil unit, and the second airfoil unit may be integrally formed as a single, one-piece component.

In some embodiments, the turbine vane assembly may further include a second platform. The second platform may comprise ceramic matrix composite materials. The second platform may be spaced apart radially from the first platform.

In some embodiments, the second platform may be coupled with and integrally formed with the first airfoil unit. In some embodiments, the second platform may be coupled with and integrally formed with the second airfoil unit.

In some embodiments, the turbine vane assembly may further include a third platform. The third platform may comprise ceramic matrix composite materials. The third platform may be spaced apart radially from the first platform. In some embodiments, the third platform may be coupled with and integrally formed with the second airfoil unit.

In some embodiments, the first platform may include a first ceramic laminate layer, a second ceramic laminate layer, and a third ceramic laminate layer. The first ceramic laminate layer may be arranged around the first airfoil unit. The second ceramic laminate layer may be arranged around the second airfoil unit. The third ceramic laminate layer may be arranged around the first airfoil unit and the second airfoil unit and may be layered on the first ceramic laminate layer and the second ceramic laminate layer.

In some embodiments, the first platform may include a first 3D woven ceramic structure and a 2D sub-laminate layer of ceramic matrix composite materials. The first 3D woven ceramic structure may be arranged around the first airfoil unit. The 2D sub-laminate layer of ceramic materials may be pre-formed on the first 3D woven ceramic structure.

In some embodiments, the first platform may include a second 3D woven ceramic structure. The second 3D woven ceramic structure may be arranged around the second airfoil unit. The 2D sub-laminate layer of ceramic materials may be pre-formed on the first and second 3D woven ceramic structure to couple the first 3D woven ceramic structure with the second 3D woven ceramic structure.

In some embodiments, the first platform may include a plurality of ceramic laminate layers. Each of the plurality of ceramic laminate layers may be formed to define a first hole and a second hole. The first hole may extend radially through the ceramic laminate layer. The second hole may extend radially through the ceramic laminate layer.

In some embodiments, the first airfoil unit may extend radially through the first hole. The second airfoil unit may extend radially through the second hole.

In some embodiments, the first airfoil unit may include a vane core and a locking layup. The vane core may extend radially through the first platform. The locking layup may include a filler and a core overwrap. The filler may be coupled with the vane core and aligned radially with the first platform. The core overwrap may extend radially along the vane core from a tip of the vane core toward the first platform and may extend along the filler to cause the core overwrap to flare away from the vane core and engage the first platform.

According to another aspect of the present disclosure, a method may include several steps. The method may include providing a first platform, a second platform, a first airfoil unit, and a second airfoil unit. The first platform, the second platform, the first airfoil unit, and the second airfoil unit may each comprise ceramic matrix composite materials. The first platform may extend circumferentially partway about an axis. The second platform may extend circumferentially partway about the axis.

In some embodiments, the method may further include arranging a portion of the first airfoil unit through a first airfoil unit-shaped hole formed in the first platform and a portion of the second airfoil unit through a second airfoil unit-shaped hole formed in the first platform. The first airfoil unit and second airfoil units may be arranged in the corresponding airfoil unit-shaped holes in the first platform to couple the first platform with the first airfoil unit and the second airfoil unit.

In some embodiments, the method may further include arranging another portion of the first airfoil unit through a first airfoil unit-shaped hole formed in the second platform and another portion of the second airfoil unit through a second airfoil unit-shaped hole formed in the second platform. The first airfoil unit and second airfoil units may be arranged in the corresponding airfoil unit-shaped holes in the second platform to couple the second platform with the first airfoil unit and the second airfoil unit.

In some embodiments, the method may further include infiltrating the first platform, the second platform, the first airfoil unit, and the second airfoil unit with ceramic matrix composite material. The first platform, the second platform, the first airfoil unit, and the second airfoil unit may be infiltrated with ceramic matrix composite materials to form an integral, single piece component.

In some embodiments, the first platform and the second platform may each include a first 3D woven ceramic structure, a second 3D woven ceramic structure, and a 2D sub-laminate layer of ceramic materials. In some embodiments, the method may further include arranging the first 3D woven ceramic structure around the first airfoil unit, arranging the second 3D woven ceramic structure around the second airfoil unit, and pre-forming the 2D sub-laminate layer of ceramic materials on the first and second 3D woven ceramic structures to couple the first 3D woven ceramic structure with the second 3D woven ceramic structure.

In some embodiments, the first airfoil unit and second airfoil unit may each include a vane core and a locking layup. The vane core may extend radially through the first platform and the second platform. The locking layup may include a filler and a core overwrap. The filler may be coupled with the vane core and aligned radially with one of the first platform and the second platform. The core overwrap may extend radially along the vane core from a tip of the vane core toward one of the first platform and the second platform and may extend along the filler to cause the core overwrap to flare away from the vane core and engage one of the first platform and the second platform.

These and other features of the present disclosure will become more apparent from the following description of the illustrative embodiments.

DETAILED DESCRIPTION OF THE DRAWINGS

Figure 2:
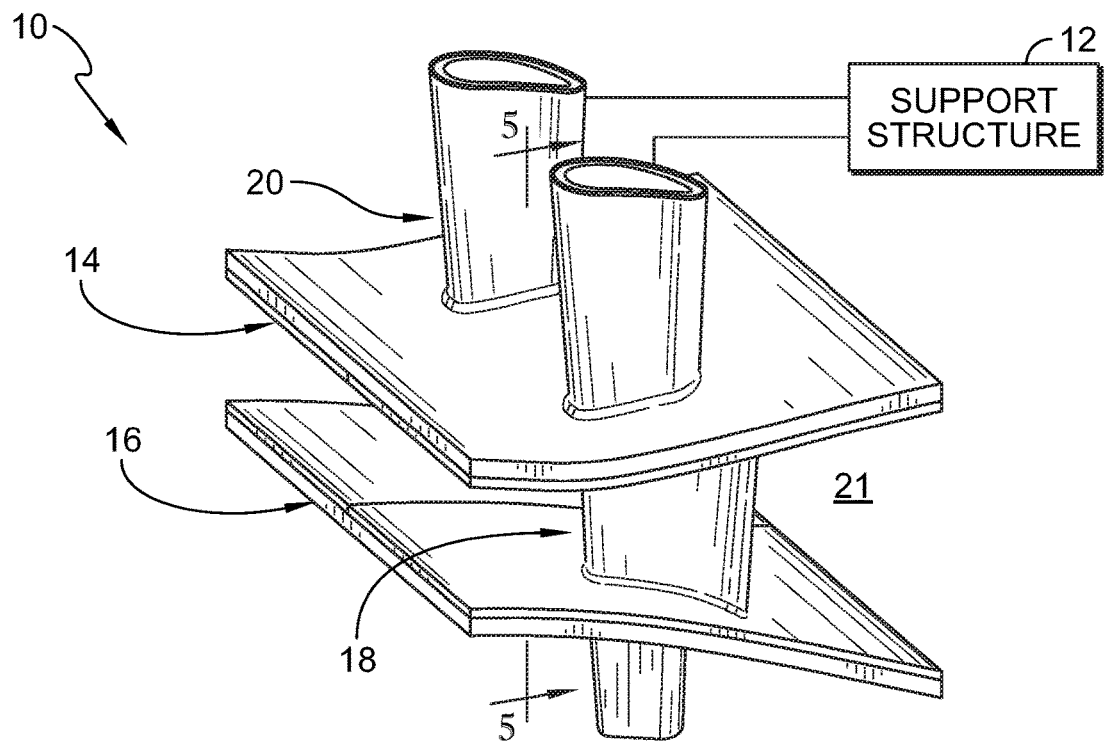
FIG. 2 is a perspective view of a turbine vane assembly made of ceramic matrix composite material for use in the gas turbine engine of FIG. 1 showing that the vane assembly is an integrated component that includes two airfoil units shaped to redirect air moving through a primary gas path in the gas turbine engine, a first platform that extends circumferentially partway about the axis to define a first boundary of the gas path of the gas turbine engine, and a second platform spaced apart radially from the first platform that extends circumferentially partway about the axis to define a second boundary of the gas path of the gas turbine engine.
Figure 3:
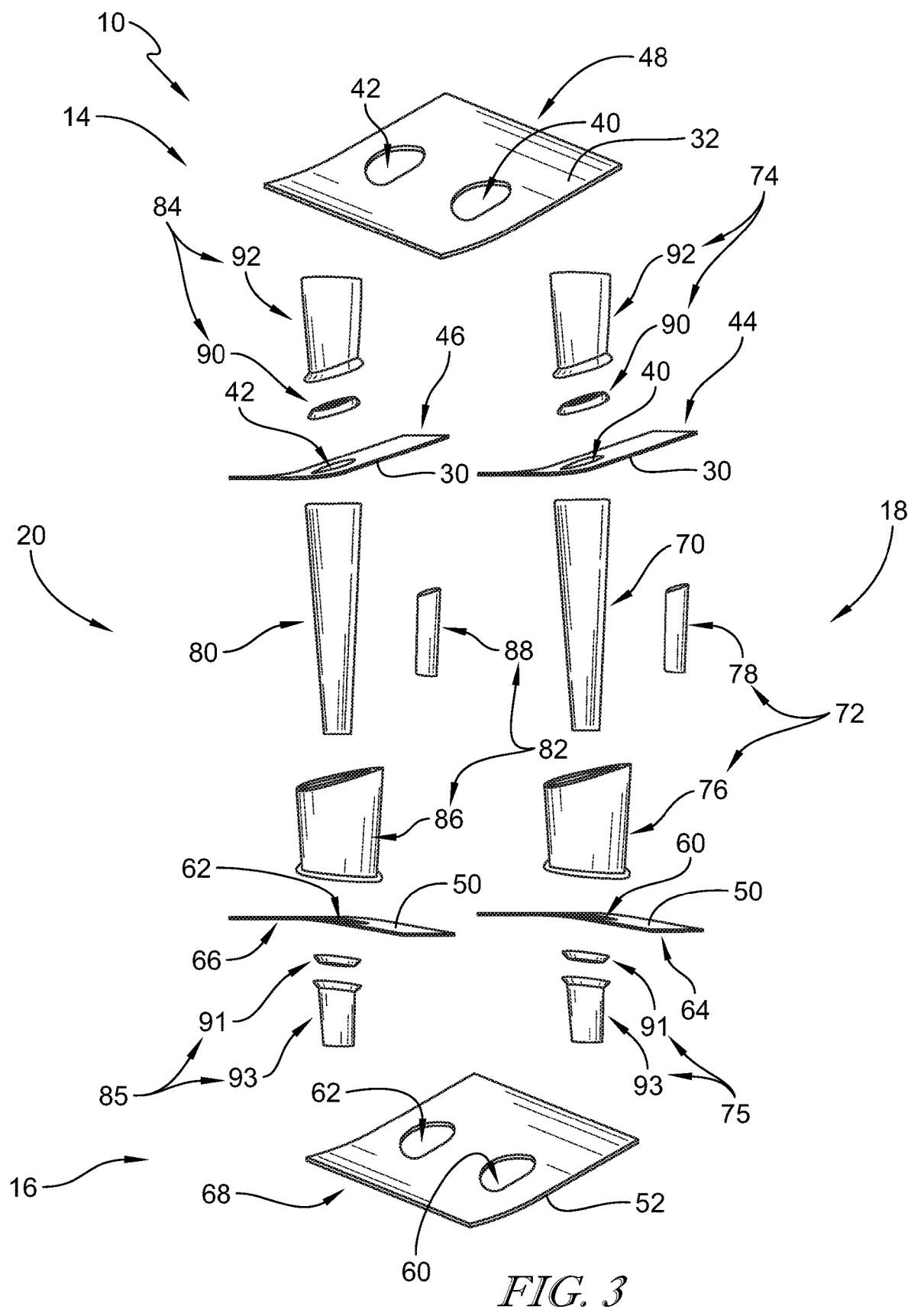
FIG. 3 is an exploded view of the turbine vane assembly of FIG. 2 showing the airfoil units each include an airfoil body that extends between the platforms, a vane core configured to extend radially through the platforms, and locking layups at the outer and inner ends of the airfoil unit to strengthen the joints between the platforms and the airfoil body.
Figure 4:
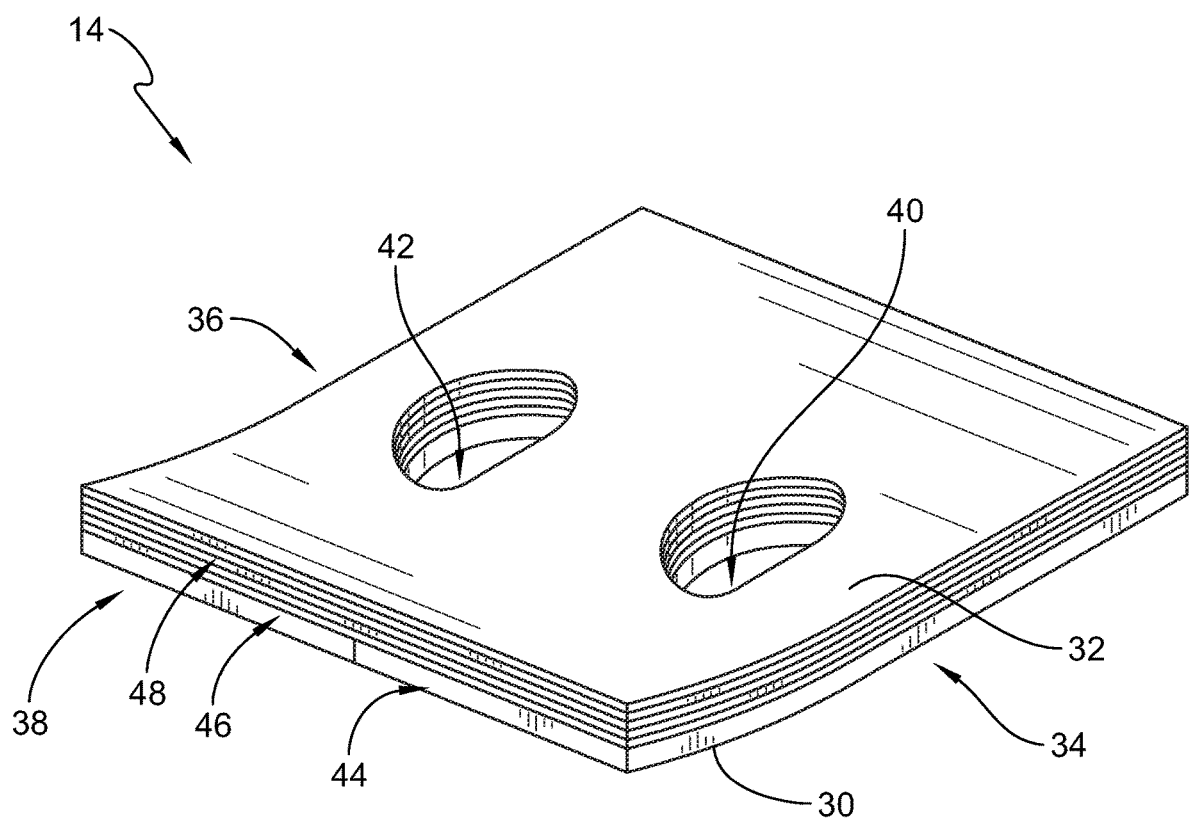
FIG. 4 is a perspective view of one of the first platform and second platform of FIG. 3 showing the platform includes a plurality of ceramic laminate layers that are each formed to define a first airfoil unit-shaped hole and a second airfoil unit-shaped hole that extend radially through the ceramic laminate layers.

For the purposes of promoting an understanding of the principles of the disclosure, reference will now be made to a number of illustrative embodiments illustrated in the drawings and specific language will be used to describe the same An integral, one-piece ceramic matrix composite turbine vane assembly 10 for use in a gas turbine engine 110 is shown in FIG. 2. The turbine vane assembly 10 includes a first platform 14, a second platform 16, and a pair of airfoil units 18, 20 as shown in FIGS. 2-4. The first platform 14 and second platform 16 each extend circumferentially partway about an axis 11 of the gas turbine engine 110. The first platform 14 defines a first boundary of a gas path 21 of the turbine vane assembly 10, while the second platform 16 is spaced apart radially from the first platform 14 to define a second boundary of the gas path 21. The second airfoil unit 20 is spaced apart circumferentially from the first airfoil unit 18. Each of the airfoil units 18, 20 is adapted to interact with gases flowing through the gas path 21 and extends radially relative to the axis 11 between the first platform 14 and the second platform 16.

The first platform 14, the second platform 16, the first airfoil unit 18, and the second airfoil unit 20 all comprise ceramic matrix composite materials in the illustrative embodiment. The ceramic matrix composite materials forming the turbine vane assembly 10 include a plurality of plies and/or preforms with ceramic-containing fibers. The plurality of plies and/or preforms are laid-up relative to one another and then infiltrated with ceramic matrix material to integrate the first platform 14, the second platform 16, and the airfoil units 18, 20 with one another and form a single, integral, one-piece ceramic matrix composite turbine vane 10. The plurality of plies and/or preforms are shaped to reinforce the joints between the airfoil units and the platforms.

Figure 1:
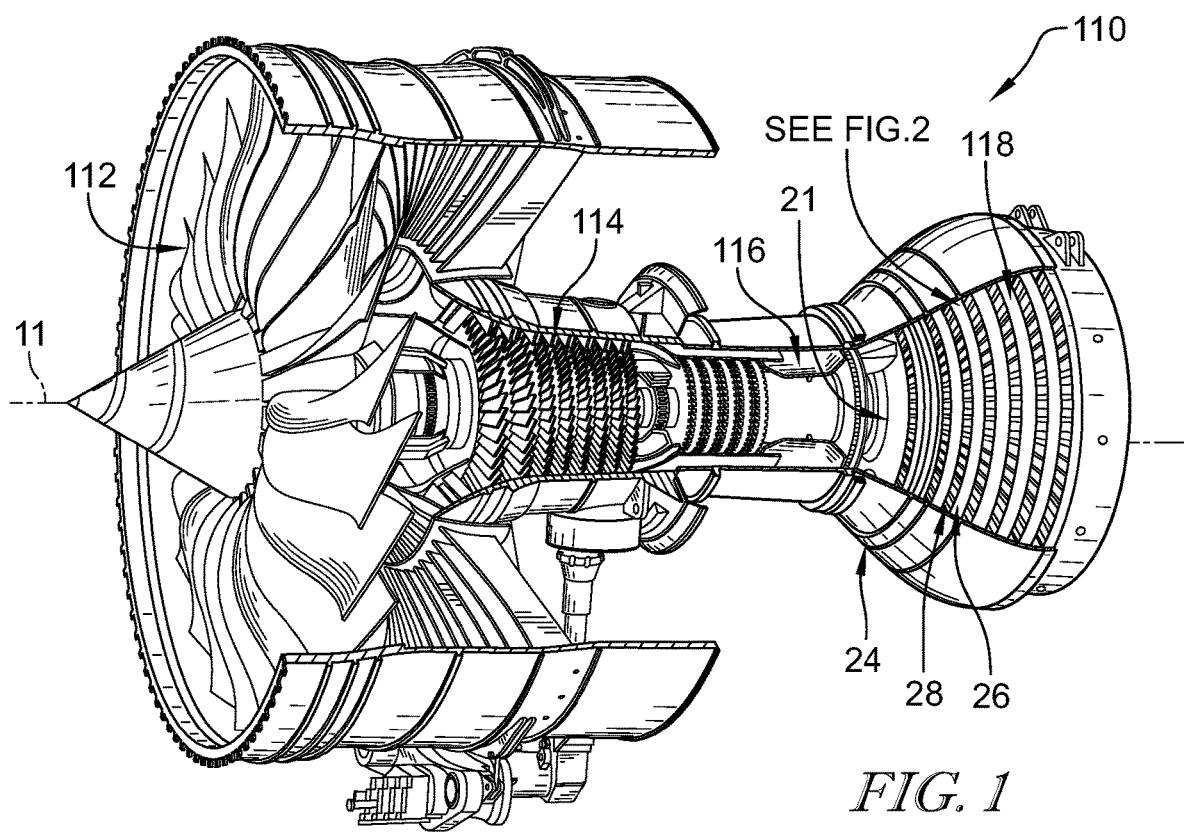
FIG. 1 is a cutaway view of a gas turbine engine that includes a fan, a compressor, a combustor, and a turbine, the turbine including rotating wheel assemblies configured to rotate about an axis of the engine and static turbine vane rings configured to direct air into downstream rotating wheel assemblies.

The turbine vane assembly 10 is adapted for use in the gas turbine engine 110, which includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis of the gas turbine engine 110 and drive the compressor 114 and the fan 112. In other embodiments, the fan 112 may be omitted and the turbine 118 drives a propeller, drive shaft, or other suitable alternative.

The turbine 118 includes a turbine case 24, a plurality of static turbine vane rings 26 that are fixed relative to the axis, and a plurality of bladed rotating wheel assemblies 28 as suggested in FIG. 1. Each turbine vane ring 26 includes a plurality of turbine vane assemblies 10. The hot gases are conducted through the gas path 21 and interact with the bladed wheel assemblies 28 to cause the bladed wheel assemblies 28 to rotate about the axis 11. The turbine vane rings 26 are positioned to direct the gases toward the bladed wheel assemblies 28 with a desired orientation.

Each turbine vane ring 26 is made up of a plurality of individual turbine vane assemblies 10 and a support structure 12. The turbine vane assembly 10 comprises ceramic matrix composite materials and are arranged circumferentially adjacent to one another to form a ring that extends around the axis 11. The support structure 12, shown diagrammatically in FIG. 2, comprises metallic materials and engages the turbine vane assembly 10 to couple the turbine vane assembly 10 to the support structure 12 to provide a simply supported load path from each airfoil of the turbine vane assemblies 10 to the support structure 12 so that aerodynamic loading of each airfoil may be directly transmitted from the airfoils to the support structure 12. In some embodiments, the support structure 12 may be adapted for mounting in a ring or to the turbine case 24 included in the turbine section 118. In some embodiments, the support structure 12 includes a carrier arranged circumferentially about the axis 11 and spars that extends radially inward from the carrier and into the airfoil units 18, 20.

In the illustrative embodiment, the first platform 14 forms an outer boundary of the gas path 21, while the second platform 16 forms an inner boundary of the gas path 21. In other embodiments, the arrangement may be reversed.

Figure 5:
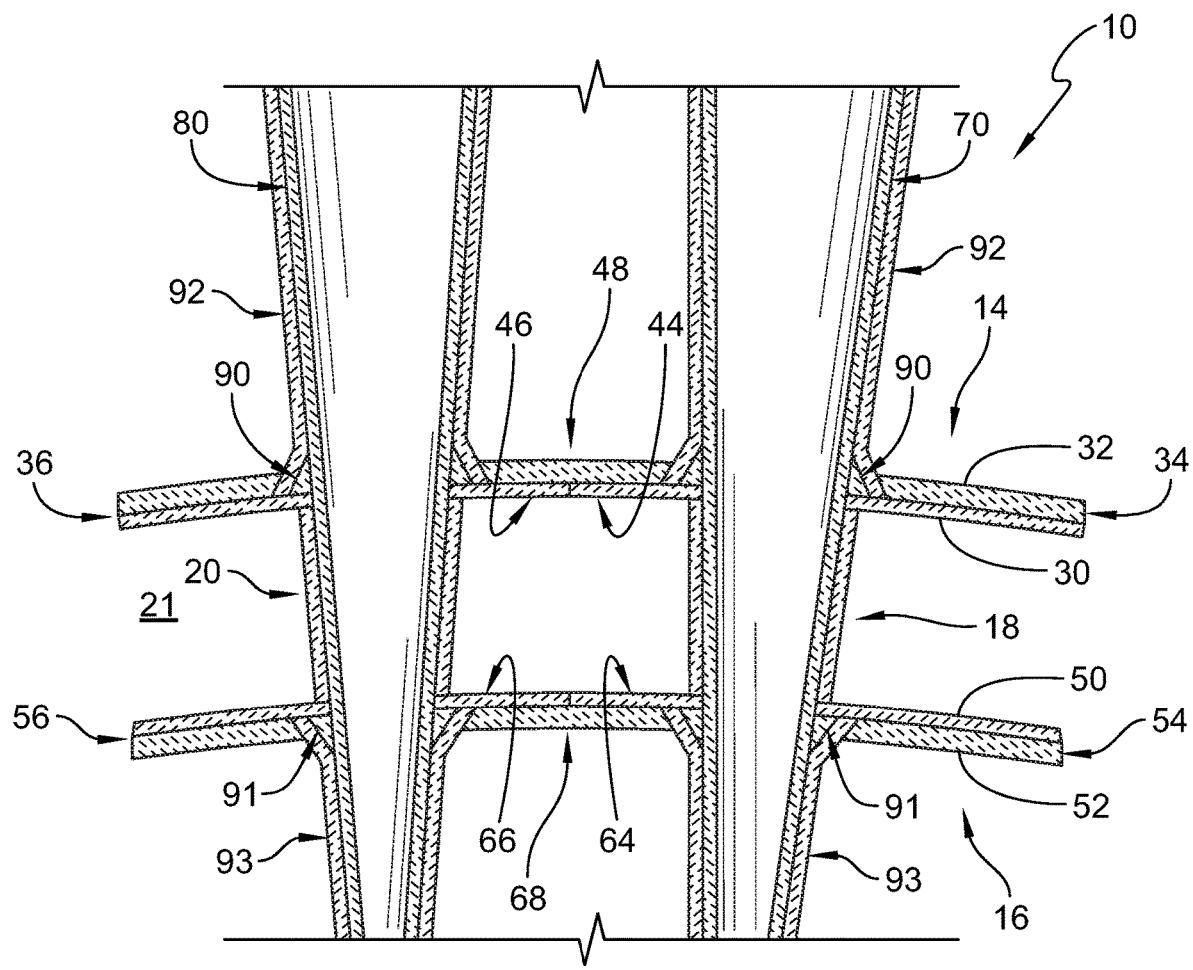
FIG. 5 is a section view of the turbine vane assembly of FIG. 2 taken along line 5-5 showing the first platform and second platform each include a first ceramic layer arranged around the first airfoil unit, a second ceramic layer arranged around the second airfoil unit, and a 2D sub-laminate layer that is pre-formed on the first and second layers to integrally couple the first ceramic layer, the first airfoil unit, the second ceramic layer, and the second airfoil unit.

The first platform 14 forms a radially inwardly facing surface 30, a radially outwardly facing surface 32, a first side wall 34, and a second side wall 36 as shown in FIGS. 3-5. The radially inwardly facing surface 30 defines the first boundary of the gas path 21. The radially outwardly facing surface 32 is opposite the radially inwardly facing surface 30. The radially inwardly facing surface 30 and the radially outwardly facing surface 32 extend continuously circumferentially between the first side wall 34 and the second side wall 36. In the illustrative embodiment, the first airfoil unit 18 and the second airfoil unit 20 are located circumferentially between the first side wall 34 and the second side wall 36 of the first platform 14.

The first platform 14 includes a plurality of ceramic laminate layers 38 and each of the plurality of ceramic laminate layers 38 is formed to define a first airfoil unit-shaped hole 40 and a second airfoil unit-shaped hole 42 as shown in FIGS. 3-5. The first airfoil unit-shaped hole 40 and the second airfoil unit-shaped hole 42 each extend radially through the ceramic laminate layers 38. In the illustrative embodiment, the second hole 42 is spaced circumferentially apart from the first hole 40. The first airfoil unit 18 extends radially through the first hole 40 and the second airfoil unit 20 extends radially through the second hole 42.

The plurality of ceramic laminate layers 38 includes a first ceramic layer 44, a second ceramic layer 46, and a 2D sub-laminate layer 48 as shown in FIGS. 3 and 5. The first layer 44 is arranged around the first airfoil unit 18 and the second layer 46 is arranged around the second airfoil unit 20. The 2D sub-laminate layer 48 is pre-formed on the first and second layers 44, 46 to couple the first ceramic layer 44 with the second ceramic layer 46. The 2D sub-laminate layer 48 extends around both the first airfoil unit 18 and the second airfoil unit 20. In other embodiments, different arrangements of layers and laminates may be used. In other embodiments, the 2D sub-laminate layer 48 may instead be a 3D pre-form layer 48.

The second platform 16 forms a radially outwardly facing surface 50, a radially inwardly facing surface 52, a first side wall 54, and a second side wall 56 as shown in FIGS. 3-5. The radially outwardly facing surface 50 defines the second boundary of the gas path 21. The radially inwardly facing surface 52 is opposite the radially outwardly facing surface 50. The radially outwardly facing surface 50 and the radially inwardly facing surface 52 extend continuously circumferentially between the first side wall 54 and the second side wall 56. In the illustrative embodiment, the first airfoil unit 18 and the second airfoil unit 20 are located circumferentially between the first side wall 54 and the second side wall 56 of the second platform 16.

The second platform 16 includes a plurality of ceramic laminate layers 58 and each of the plurality of ceramic laminate layers 58 is formed to define a first airfoil unit-shaped hole 60 and a second airfoil unit-shaped hole 62 as shown in FIGS. 2-5. The first airfoil unit-shaped hole 60 and the second airfoil unit-shaped hole 62 each extend radially through the ceramic laminate layers 58. In the illustrative embodiment, second hole 62 is spaced circumferentially apart from the first hole 60 and the first airfoil unit 18 extends radially through the first hole 60, and the second airfoil unit 20 extends radially through the second hole 62.

The plurality of ceramic laminate layers 58 includes a first ceramic layer 64, a second ceramic layer 66, and a 2D sub-laminate layer 68 as shown in FIGS. 3 and 5. The first layer 64 is arranged around the first airfoil unit 18 and the second layer 66 arranged around the second airfoil unit 20. The 2D sub-laminate layer 68 is pre-formed on the first and second layers 64, 66 to couple the first ceramic layer 64 with the second ceramic layer 66. The 2D sub-laminate layer 68 extends around both the first airfoil unit 18 and the second airfoil unit 20. In other embodiments, different arrangements of layers and laminates may be used.

In the illustrative embodiment, the first and second ceramic layers 44, 46, 64, 66 of each platform 14, 16 may be 2D sub-laminate layers. In other embodiments, the first and second ceramic layers 44, 46, 64, 66 of each platform 14, 16 may be 3D woven ceramic structures. In some embodiments, any of the ceramic layers 44, 46, 48, 64, 66, 68 may be a single or multiple ply preform with a two-dimensional, a two and one-half dimensional, or a three-dimensional construction.

The first airfoil unit 18 includes a vane core 70, an airfoil body 72, and locking layups 74, 75 as shown in FIGS. 2-4. The vane core 70 extends radially through the first platform 14 and the second platform 16. The airfoil body 72 is located radially between the first platform 14 and the second platform 16 and arranged around the vane core 70. Each locking layup 74, 75 is coupled with the vane core 70 and respective platform 14, 16 to block axial movement of the platforms 14, 16 to the vane core 70.

The airfoil body 72 includes an airfoil overwrap 76 and an airfoil filler 78 as shown in FIG. 3. The airfoil overwrap 76 covers the vane core 70 within the gas path 21. The airfoil filler 78 provides at least a portion of a trailing edge of the vane assembly 10 within the gas path 21.

The second airfoil unit 20 includes a vane core 80, an airfoil body 82, and locking layups 84, 85 as shown in FIGS. 2-4. The vane core 80 extends radially through the first platform 14 and the second platform 16. The airfoil body 82 is located radially between the first platform 14 and the second platform 16 and arranged around the vane core 80. Each locking layup 84, 85 is coupled with the vane core 80 and respective platform 14, 16 to block axial movement of the platforms 14, 16 to the vane core 80.

The airfoil body 82 includes an airfoil overwrap 86 and an airfoil filler 88 as shown in FIG. 3. The airfoil overwrap 86 covers the vane core 80 within the gas path 21. The airfoil filler 88 provides at least a portion of a trailing edge of the vane assembly 10 within the gas path 21.

In the illustrative embodiment, each airfoil overwrap 76, 86 is formed as a tube or a folded sheet that completely surrounds the vane core 70, 80 and the airfoil filler 78, 88 within the gas path 21. The tube or sheet forming the airfoil overwrap 76, 86 may be a single or multiple ply preform with a two-dimensional, a two and one-half dimensional, or a three-dimensional construction. The airfoil filler 78, 88 is formed as an insert or a noodle (i.e. loose strands of reinforcement fibers in matrix material) that is positioned adjacent to the vane core 70, 80 and is offset radially from the axis 11.

Each locking layup 74, 75, 84, 85 includes a filler 90, 91 and a core overwrap 92, 93 as shown in FIGS. 2-4. The first filler 90 is coupled with the vane core 70, 80 and aligned radially with the first platform 14, while the second filler 91 is coupled with the vane core 70, 80 and aligned radially with the second platform 16. The first core overwrap 92 extends radially along the vane core 70, 80 from a first tip 94 of the vane core 70, 80 toward the first platform 14. The second core overwrap 93 extends radially along the vane core 70, 80 from a second tip 96 of the vane core 70, 80 toward the second platform 16. Each of the overwraps 92, 93 extend along the corresponding filler 90, 91 to cause the core overwrap 92, 93 to flare way from the vane core 70, 80.

In some embodiments, the turbine vane assembly 10 may further include reinforcement features at the interface between the first platform and second platform with the first and second airfoil units. The reinforcement features may include stitching, tufting, z-pinning, or another suitable reinforcement feature applied to the ceramic matrix composite material. The reinforcement features may be applied to the flare away areas where the first and second platforms overlap the locking layups 74, 75, 84, 85 of the first and second airfoil units.

A method of constructing the turbine vane assembly 10 may include several steps. The method includes arranging a portion of the vane core 70 through the first hole 40 of the first ceramic layer 44 and arranging another portion of the vane core 70 through the first hole 60 of the first ceramic layer 64. Next, the method includes arranging a portion of the vane core 80 through the second hole 42 of the second ceramic layer 46 and arranging another portion of the vane core 80 through the second hole 62 of the second ceramic layer 66.

After the ceramic layers 44, 46, 64, 66 are assembled with the vane cores 70, 80, the method includes forming the first airfoil unit 18 and the second airfoil unit 20. The forming step includes positioning the airfoil filler 78 at the trailing edge of the vane core 70 and overwrapping the airfoil overwrap 76 around a portion of the vane core 70 and the airfoil filler 78. The same step is repeated for the airfoil filler 88 and the airfoil overwrap 86.

Once the airfoil overwraps 76, 86 are wrapped about the corresponding vane core 70, 80 and filler 78, 88, the method continues by arranging the fillers 90 over the vane cores 70, 80 and coupling the fillers 90 with the vane cores 70, 80 so that each filler 90 is aligned radially with the corresponding ceramic layer 44, 64. Additionally, the fillers 91 are arranged over the vane cores 70, 80 and coupled with the vane cores 70, 80 so that each filler 91 is aligned radially with the corresponding ceramic layer 46, 66.

After the fillers 90, 91 are coupled to the vane cores 70, 80 at the respective outer and inner sides of the vane cores 70, 80, the method includes overwrapping the vane core 70, 80 and filler 90 with the core overwrap 92. The same overwrapping step is done for the inner side of the vane cores 70, 80. Each core overwrap 93 is wrapped around the vane core 70, 80 and the filler 91.

After each airfoil unit 18, 20 is formed, the method continues by arranging a portion of the vane core 70 with the core overwrap 92 through the first hole 40 in the 2D sub-laminate layer 48 and arranging a portion of the vane core 80 with the core overwrap 92 through the second hole 42 in the sub-laminate layer 48. The 2D sub-laminate layer 48 is arranged over the assembled airfoil units 18, 20 so as to engage the ceramic layers 44, 46 and couple the assembled airfoil units 18, 20 together.

Additionally, the method may include arranging another portion of the vane core 70 with the core overwrap 93 through the first hole 60 formed in the 2D sub-laminate layer 68 and arranging another portion of the vane core 80 with the core overwrap 93 through the second hole 62 formed in the 2D sub-laminate layer 68. The 2D sub-laminate layer 68 is arranged over the assembled airfoil units 18, 20 so as to engage the ceramic layers 46, 66 and couple the assembled airfoil units 18, 20 together. Once the 2D sub-laminate layers 48, 68 of ceramic materials are arranged over the first and second airfoil units 18, 20, the assembled structures are infiltrated with matrix material to form as a single, one-piece component 10.

Figure 6:
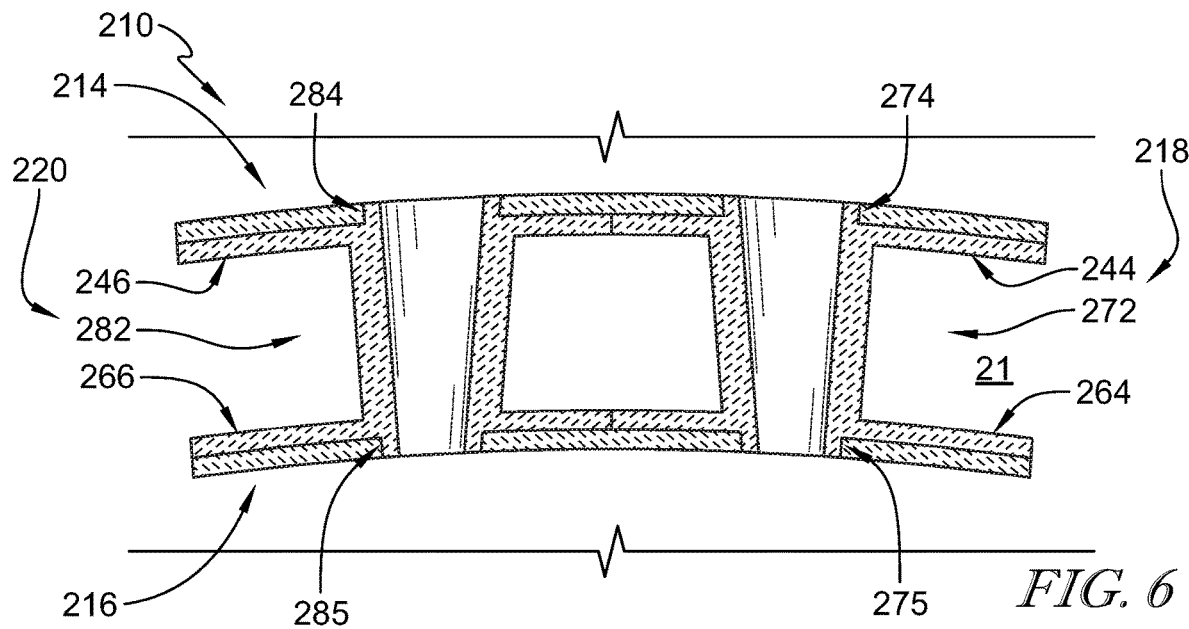
FIG. 6 is a section view of another turbine vane assembly made of ceramic matrix composite material for use in the gas turbine engine of FIG. 1 showing that the vane assembly includes two airfoils, a first platform that extends circumferentially partway about the axis, and a second platform spaced apart radially from the first platform that extends circumferentially partway about the axis.
Figure 7:
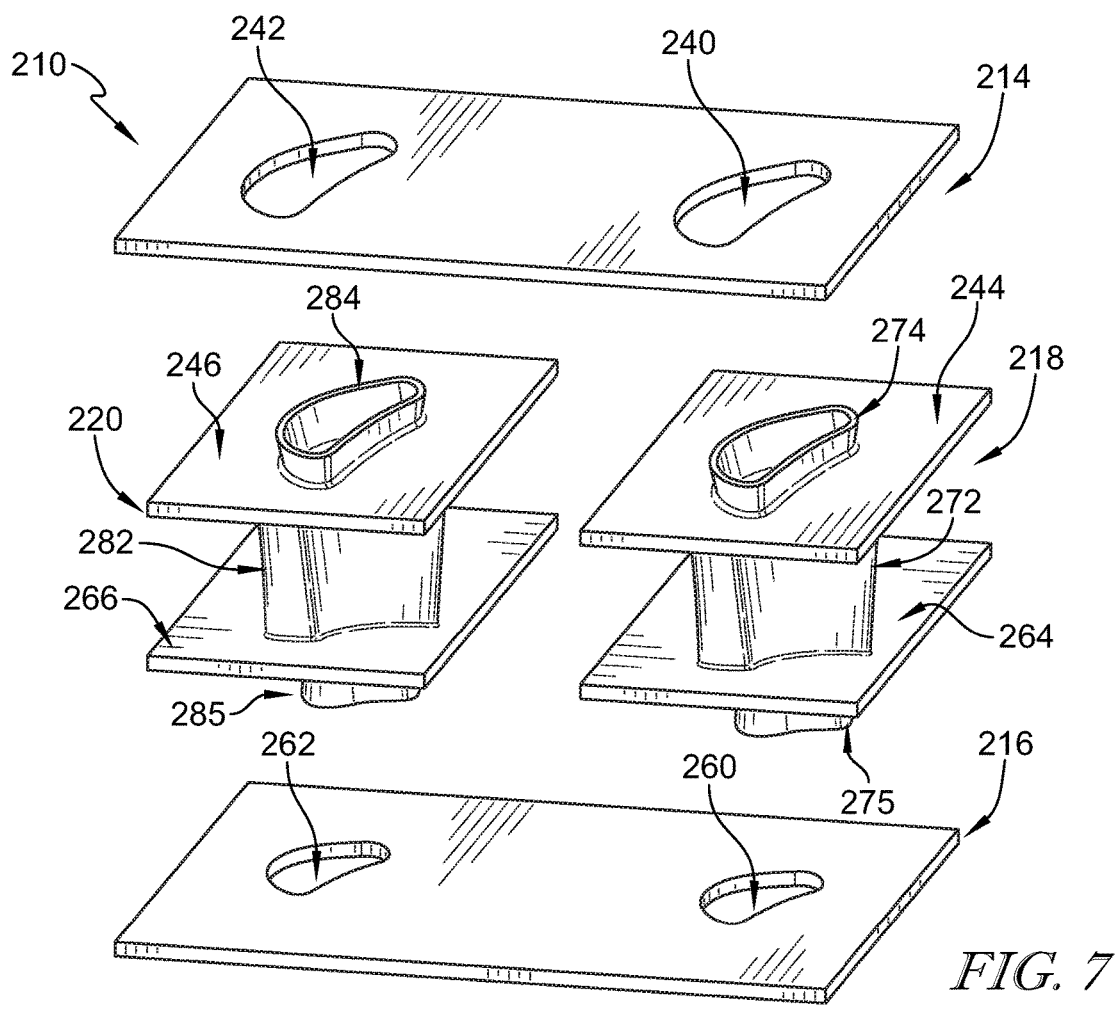
FIG. 7 is an exploded view of the turbine vane assembly of FIG. 6 showing the airfoil units comprise 3D woven ceramic strictures arranged between the two platforms.

Another embodiment of a turbine vane assembly 210 in accordance with the present disclosure is shown in FIGS. 6 and 7. The turbine vane assembly 210 is substantially similar to the turbine vane assembly 10 shown in FIGS. 1-5 and described herein. Accordingly, similar reference numbers in the 200 series indicate features that are common between the turbine vane assembly 10 and the turbine vane assembly 210. The description of the turbine vane assembly 10 is incorporated by reference to apply to the turbine vane assembly 210, except in instances when it conflicts with the specific description and the drawings of the turbine vane assembly 210.

The turbine vane assembly 210 includes a first platform 214, a second platform 216, and a pair of airfoil units 218, 220 as shown in FIGS. 6 and 7. The first platform 214 and second platform 216 each extend circumferentially partway about the axis 11 of the gas turbine engine 110. The second airfoil unit 220 is spaced apart circumferentially from the first airfoil unit 218 and each extend radially relative to the axis 11 between the first platform 214 and the second platform 216.

The first platform 214, the second platform 216, the first airfoil unit 218, and the second airfoil unit 220 all comprise ceramic matrix composite materials. In the illustrative embodiment, the first airfoil unit 218 and the second airfoil unit 220 are 3D woven integral ceramic structures as suggested in FIG. 6. The first platform 214 and the second platform 216 are arranged at inner and outer ends of the airfoil units 218, 220 before the entire structure is infiltrated to form a single, one-piece component.

The first platform 214 is a 2D sub-laminate layer that is formed to define a first airfoil unit-shaped hole 240 and a second airfoil unit-shaped hole 242 as shown in FIG. 7. The first airfoil unit-shaped hole 240 and the second airfoil unit-shaped hole 242 each extend radially through the sub-laminate layer. In the illustrative embodiment, second hole 242 is spaced circumferentially apart from the first hole 240 and a portion of the first airfoil unit 218 extends radially through the first hole 240, while a portion of the second airfoil unit 220 extends radially through the second hole 242.

The second platform 216 is a 2D sub-laminate layer that is formed to define a first airfoil unit-shaped hole 260 and a second airfoil unit-shaped hole 262 as shown in FIG. 7. The first airfoil unit-shaped hole 260 and the second airfoil unit-shaped hole 262 each extend radially through the sub-laminate layer. In the illustrative embodiment, second hole 262 is spaced circumferentially apart from the first hole 260 and another portion of the first airfoil unit 218 extends radially through the first hole 260, while another portion of the second airfoil unit 220 extends radially through the second hole 262.

In the illustrative embodiments, the platforms 214, 216 are 2D ceramic laminate layers. In other embodiments, the platforms 214, 216 may be 3D woven ceramic structures.

Each airfoil unit 218, 220 includes an airfoil body 272, 282, platforms 244, 246, 264, 268, and vane extensions 274, 275, 284, 285 in the illustrative embodiment. The airfoil body 272, 282 is located radially between the platforms 244, 246, 264, 266. The platforms 244, 246, 264, 266 extend circumferentially at least partway about the axis 11. The vane extensions 274, 275, 284, 285 extend radially away from the platforms 244, 246, 264, 266 through the hole 240, 242 formed in the first platform 214 and the hole 260, 262 formed in the second platform 216. In the illustrative embodiment, each airfoil unit 218, 220 is an integral, 3D woven ceramic structure as shown in FIG. 6.

A method of constructing the turbine vane assembly 210 may include several steps. The method includes forming the first airfoil unit 218 and the second airfoil unit 220 by 3D weaving the ceramic structure. Next, the method includes arranging the extension of the first airfoil unit 218 in the hole 240 formed in the first platform 214 and arranging the extension of the second airfoil unit 220 in the hole 242 in the first platform 214 so that the first and second airfoil units 218, 220 are circumferentially adjacent to one another.

Then, the second platform 216 is assembled onto the airfoil units 218, 220. The method includes arranging the other extension of the first airfoil unit 218 in the hole 260 formed in the second platform 216 and arranging the other extension of the second airfoil unit 220 in the hole 262 in the second platform 216. After the platforms 214, 216 are assembled on the radial inner and outer ends of the 3D woven ceramic structures of the airfoil units 218, 220, the method continues by infiltrating the assembled structures to form as a single, one-piece component 210.

Figure 8:
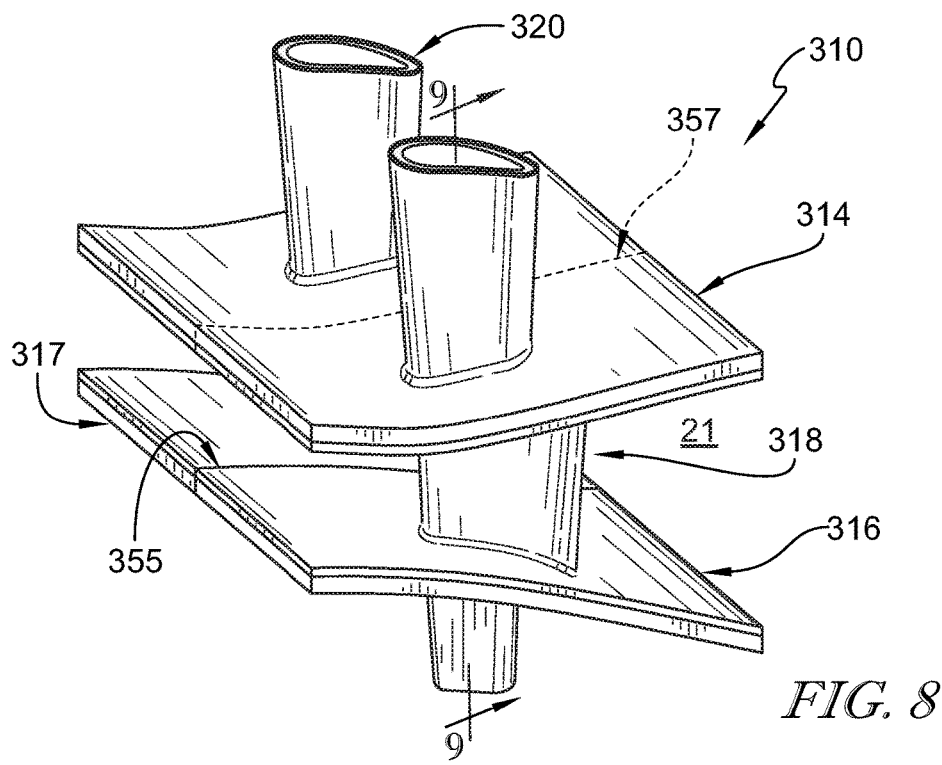
FIG. 8 is a perspective view of another turbine vane assembly made of ceramic matrix composite material for use in the gas turbine engine of FIG. 1 showing that the vane assembly includes two airfoil units, a first platform that extends circumferentially partway about the axis, a second platform spaced apart radially from the first platform that extends circumferentially partway about the axis, and a third platform spaced apart radially from the first platform and adjacent to the second platform.
Figure 9:
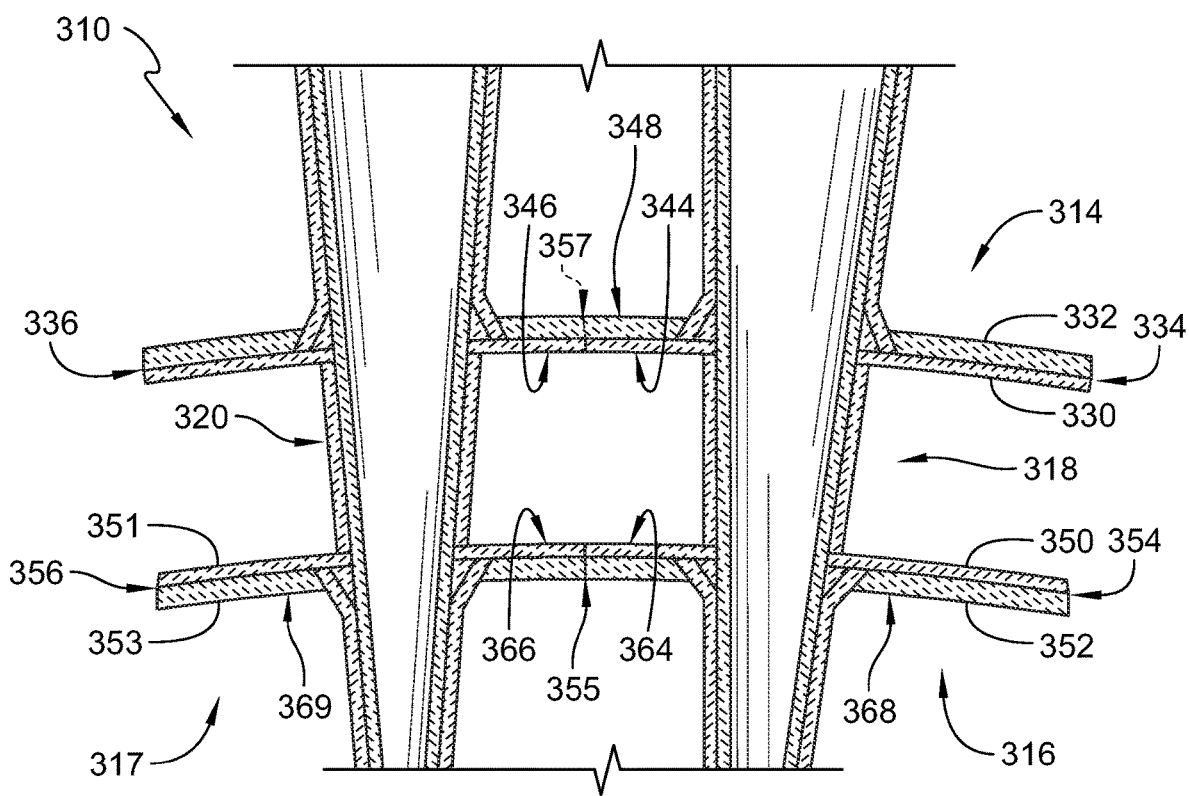
FIG. 9 is a cross section view of the turbine vane assembly of the FIG. 8 taken along line 9-9 showing the second platform is arranged circumferentially and axially about the first airfoil unit, the third platform is arranged circumferentially and axially about the second airfoil unit, and the first platform is arranged circumferentially and axially about both airfoil units.

Another embodiment of a turbine vane assembly 310 in accordance with the present disclosure is shown in FIGS. 8 and 9. The turbine vane assembly 310 is substantially similar to the turbine vane assembly 10 shown in FIGS. 1-5 and described herein. Accordingly, similar reference numbers in the 300 series indicate features that are common between the turbine vane assembly 10 and the turbine vane assembly 310. The description of the turbine vane assembly 10 is incorporated by reference to apply to the turbine vane assembly 310, except in instances when it conflicts with the specific description and the drawings of the turbine vane assembly 310.

The turbine vane assembly 310 includes a first platform 314, a second platform 316, a third platform 317, and a pair of airfoil units 318, 320 as shown in FIGS. 8 and 9. The first platform 314, second platform 316, and the third platform 317 each extend circumferentially partway about an axis 11 of the gas turbine engine 110. The first platform 14 defines a first boundary of the gas path 21 of the turbine vane assembly 10, while the second platform 316 and third platform 317 are spaced apart radially from the first platform 314 to define a second boundary of the gas path 21. The third platform is located adjacent the second platform along a seam 355 as shown in FIGS. 8 and 9.

The first platform 314 forms a radially inwardly facing surface 330, a radially outwardly facing surface 332, a first side wall 334, and a second side wall 336 as shown in FIG. 9. The radially inwardly facing surface 330 defines the first boundary of the gas path 21. The radially outwardly facing surface 332 is opposite the radially inwardly facing surface 330. The radially inwardly facing surface 330 and the radially outwardly facing surface 332 extend continuously circumferentially between the first side wall 334 and the second side wall 336. In the illustrative embodiment, the first airfoil unit 318 and the second airfoil unit 320 are located circumferentially between the first side wall 334 and the second side wall 336 of the first platform 314.

The first platform 314 includes a plurality of ceramic laminate layers having a first ceramic layer 344, a second ceramic layer 346, and a 2D sub-laminate layer 348 as shown in FIG. 9. The first layer 344 is arranged around the first airfoil unit 318 and the second layer 346 is arranged around the second airfoil unit 320. The 2D sub-laminate layer 348 is pre-formed on the first and second layers 344, 346 to couple the first ceramic layer 344 with the second ceramic layer 346.

The second platform 316 forms a radially outwardly facing surface 350, a radially inwardly facing surface 352, and a first side wall 354 as shown in FIG. 9. The radially outwardly facing surface 350 defines a portion of the second boundary of the gas path 21. The radially inwardly facing surface 352 is opposite the radially outwardly facing surface 350. The radially outwardly facing surface 350 and the radially inwardly facing surface 352 extend continuously circumferentially between the first side wall 354 and the seam 355. In the illustrative embodiment, the first airfoil unit 318 is located circumferentially between the first side wall 354 of the second platform 316 and the seam 355.

The second platform 316 includes a plurality of ceramic laminate layers having a third ceramic layer 364 and a 2D sub-laminate layer 368 as shown in FIG. 9. The third layer 364 is arranged around the first airfoil unit 318. The 2D sub-laminate layer 368 is pre-formed on the third layer 364.

The third platform 317 forms a radially outwardly facing surface 351, a radially inwardly facing surface 353, and a second side 356 as shown in FIG. 9. The radially outwardly facing surface 351 defines another portion of the second boundary of the gas path 21. The radially inwardly facing surface 353 is opposite the radially outwardly facing surface 351. The radially outwardly facing surface 351 and the radially inwardly facing surface 353 extend continuously circumferentially between the second side wall 356 and the seam 355. In the illustrative embodiment, the first airfoil unit 318 is located circumferentially between the seam 355 and the second side wall 356 of the third platform 317.

The third platform 317 includes a plurality of ceramic laminate layers having a fourth ceramic layer 366 and a 2D sub-laminate layer 369 as shown in FIG. 9. The fourth layer 366 is arranged around the second airfoil unit 320. The 2D sub-laminate layer 369 is pre-formed on the fourth layer 366. In the illustrative embodiment, the second platform is integrally formed with the first airfoil unit and the third platform is integrally formed with the second airfoil unit.

In the illustrative embodiment, the third and second platform 316, 317 form the inner boundary of the gas path 21, while the first platform 314 forms the outer boundary of the gas path 21. In other embodiments, sub-laminate layers 368, 369 of the second and third platforms 316, 317 may be integrally formed and extend radially between the first and second side walls 354, 356 without the seam 355, while the sub-laminate layer 348 is split into two pieces and arranged at the seam 357 as suggested in FIG. 9. In other words, the first platform 314 may form the inner boundary, while the outer boundary is divided by the second and third platforms 316, 317.

A method of constructing the turbine vane assembly 310 may include several steps. The method is similar to the method for constructing the turbine vane assembly 10, however, in the illustrative embodiment, the second platform 316 and the third platform 317 are assembled onto the corresponding airfoil unit 318, 320 separately.

The 2D sub-laminate layer 368 is arranged over the assembled airfoil unit 318 so as to engage the layer 364 and form the second platform 316. The 2D-sub-laminate layer 369 is arranged over the assembled airfoil unit 320 so as to engage the layer 366 and form the third platform 317. Once the 2D sub-laminate layers 368, 369 are arranged over the first and second airfoil units 318, 320, the method continues by infiltrating the assembled structures to form as a single, one-piece component 310.

Figure 10:
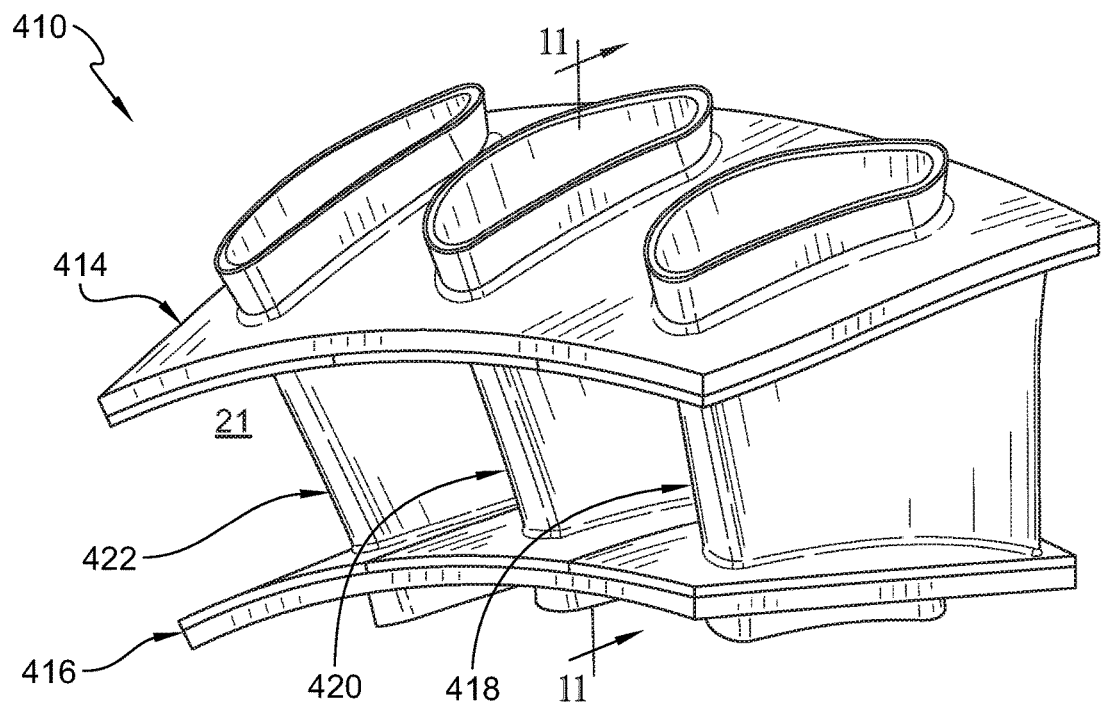
FIG. 10 is a perspective view of another turbine vane assembly made of ceramic matrix composite material for use in the gas turbine engine of FIG. 1 showing that the vane assembly includes three airfoil units, a first platform that extends circumferentially partway about the axis, and a second platform spaced apart radially from the first platform that extends circumferentially partway about the axis.
Figure 11:
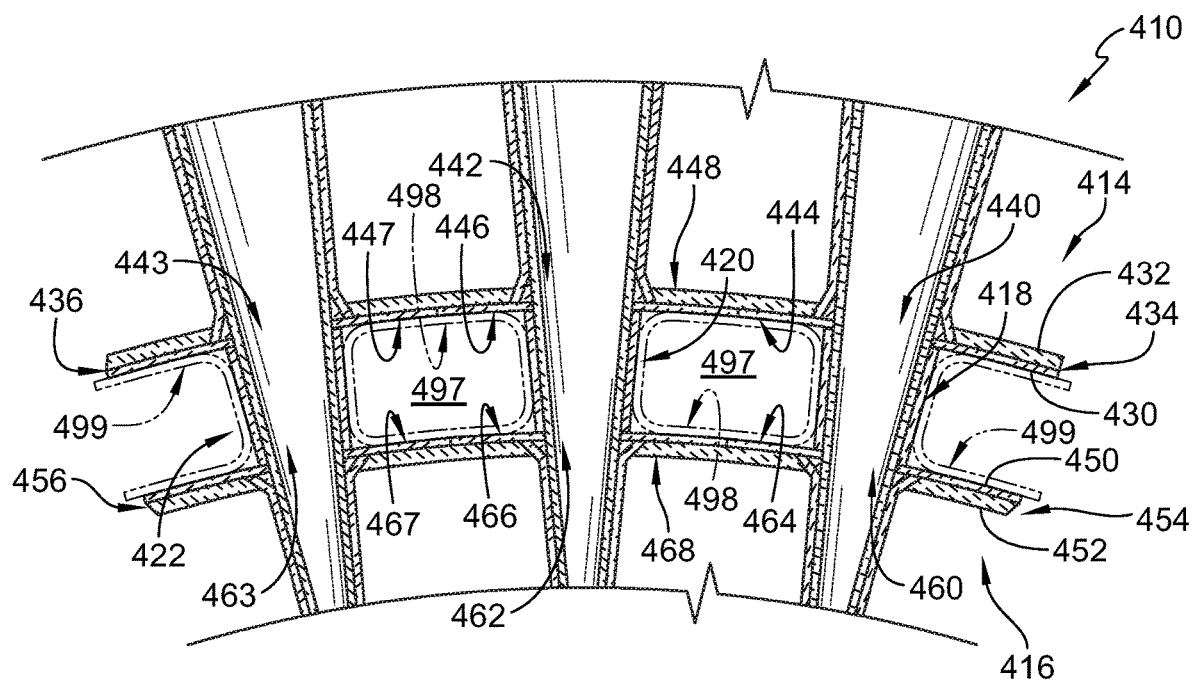
FIG. 11 is a section view of the turbine vane assembly of the FIG. 5 taking along line 11-11 showing the first platform and second platform each include a first ceramic layer arranged around the first airfoil unit, a second ceramic layer arranged around the second airfoil unit, a third ceramic layer arranged around the third airfoil unit, and a 2D sub-laminate layer that is pre-formed on the first, second, and third layers to couple the ceramic layers together.

Another embodiment of a turbine vane assembly 410 in accordance with the present disclosure is shown in FIGS. 10 and 11. The turbine vane assembly 410 is substantially similar to the turbine vane assembly 10 shown in FIGS. 1-5 and described herein. Accordingly, similar reference numbers in the 400 series indicate features that are common between the turbine vane assembly 10 and the turbine vane assembly 410. The description of the turbine vane assembly 10 is incorporated by reference to apply to the turbine vane assembly 410, except in instances when it conflicts with the specific description and the drawings of the turbine vane assembly 410.

The turbine vane assembly 410 includes a first platform 414, a second platform 416, and at least three airfoil units 418, 420, 422 as shown in FIGS. 10 and 11. The first platform 414 and second platform 416 each extend circumferentially partway about the axis 11 of the gas turbine engine 110. The first platform 414 defines a first boundary of the gas path 21 of the turbine vane assembly 10, while the second platform 416 is spaced apart radially from the first platform 414 to define a second boundary of the gas path 21. Each of the airfoil units 418, 420, 422 each extend radially relative to the axis 11 between the first platform 414 and the second platform 416 and are spaced apart circumferentially from one another.

The first platform 414 forms a radially inwardly facing surface 430, a radially outwardly facing surface 432, a first side wall 434, and a second side wall 436 as shown in FIG. 11. The radially inwardly facing surface 430 and the radially outwardly facing surface 432 extend continuously circumferentially between the first side wall 434 and the second side wall 436. In the illustrative embodiment, the airfoil units 418, 420, 422 are located circumferentially between the first side wall 434 and the second side wall 436 of the first platform 414.

The first platform 414 includes a plurality of ceramic laminate layers 438 and each of the plurality of ceramic laminate layers 438 is formed to define a first airfoil unit-shaped hole 440, a second airfoil unit-shaped hole 442, and a third airfoil unit-shaped hole 443 as shown in FIG. 11. The holes 440, 442, 443 each extend radially through the ceramic laminate layers 438. In the illustrative embodiment, the first airfoil unit 418 extends radially through the first hole 440, the second airfoil unit 420 extends radially through the second hole 442, and the third airfoil unit 422 extends radially through the third hole 443.

The plurality of ceramic laminate layers 438 includes a first ceramic layer 444, a second ceramic layer 446, a third ceramic layer 447, and a 2D sub-laminate layer 448 as shown in FIGS. 10 and 11. The first layer 444 is arranged around the first airfoil unit 418, the second layer 446 is arranged around the second airfoil unit 420, and the third layer 447 is arranged around the third airfoil unit 422. The 2D sub-laminate layer 448 is pre-formed on the first, second, and third layers 444, 446, 447 to couple the layers 444, 446, 447 together.

The second platform 416 forms a radially outwardly facing surface 450, a radially inwardly facing surface 452, a first side wall 454, and a second side wall 456 as shown in FIG. 11. The radially outwardly facing surface 450 defines the second boundary of the gas path 21. The radially outwardly facing surface 450 and the radially inwardly facing surface 452 extend continuously circumferentially between the first side wall 454 and the second side wall 456. In the illustrative embodiment, the first airfoil unit 418, the second airfoil unit 420, and the third airfoil unit 422 are located circumferentially between the first side wall 454 and the second side wall 456 of the second platform 416.

The second platform 416 includes a plurality of ceramic laminate layers 458 and each of the plurality of ceramic laminate layers 458 is formed to define a first airfoil unit-shaped hole 460, a second airfoil unit-shaped hole 462, and a third airfoil unit-shaped hole 463 as shown in FIG. 11. The holes 460, 462, 463 each extend radially through the ceramic laminate layers 458. In the illustrative embodiment, the first airfoil unit 418 extends radially through the first hole 460, the second airfoil unit 420 extends radially through the second hole 462, and the third airfoil unit 422 extends radially through the third hole 463.

The plurality of ceramic laminate layers 458 includes a first ceramic layer 464, a second ceramic layer 466, a third ceramic layer 467, and a 2D sub-laminate layer 468 as shown in FIGS. 10 and 11. The first layer 464 is arranged around the first airfoil unit 418, the second layer 466 is arranged around the second airfoil unit 420, and the third layer 467 is arranged around the third airfoil unit 422. The 2D sub-laminate layer 468 is pre-formed on the first, second, and third layers 464, 466, 467 to couple the layers 464, 466, 467 together.

In the illustrative embodiment, the turbine vane assembly 410 may further include a plurality of braided tubes 498 as suggested in FIG. 11. Each of the tubes 498 is shaped to form a box-like section that forms a passage 497 through which hot gases flow during use of the turbine vane assembly 410. As such, each of the tubes 498 provides the boundary surfaces 430, 450 of the gas path 21 by extending between the adjacent airfoil units 418, 420, 422 so as to form the suction side of one airfoil unit 418, 420 and the pressure side of the adjacent airfoil unit 420, 422.

The tubes 498 may be a 3D braided tube 498 in some embodiments. The tubes 498 may be braided of fibres that may be shaped over a mandrel before being consolidated and machined. In other embodiments, the tube 498 may be an interwoven matrix of individual or groups of fibres. In other embodiments, the tubes 498 may be formed using another method.

The end tubes 499, i.e. the tubes 499 not extending between adjacent airfoil units, may be braided like the tubes 498 and then machined when immobilized during pre-forming. In other embodiments, the tubes 499 may be woven e.g. five harness-satin that forms a joint with the braid at the leading edge and trailing edge of the airfoil units 418, 420, 422.

A method of constructing the turbine vane assembly 410 may include several steps. The method is similar to the method for constructing the turbine vane assembly 10, however, in the illustrative embodiment, the method further includes forming the third airfoil unit 422 and arranging the first platform 414 and the second platform 416 over the three airfoil units 418, 420, 422.

In the illustrative embodiment, the 2D sub-laminate layer 448 is arranged over the assembled airfoil units 418, 420, 422 so as to engage the layers 444, 446, 447 and couple the layers 444, 446, 447 together. The 2D-sub-laminate layer 468 is arranged over the assembled airfoil unit 320 so as to engage the layers 464, 466, 467 and couple the layers 464, 466, 467 together. Once the 2D sub-laminate layers 468, 469 are arranged over the first and second airfoil units 418, 420, the method continues by infiltrating the assembled structures to form as a single, one-piece component 410.

In some embodiments, the method may further include forming the braided tubes 498 and inserting the tubs 498 between adjacent airfoil units 418, 420, 422. For the end tubes 499, the method may further include machining the tubes 499 to form the ends of the turbine vane assembly 410. Once the tubes 498, 499 are inserted, the method continues by infiltrating the assembled structures to form as a single, one-piece component 410.

Figure 12:
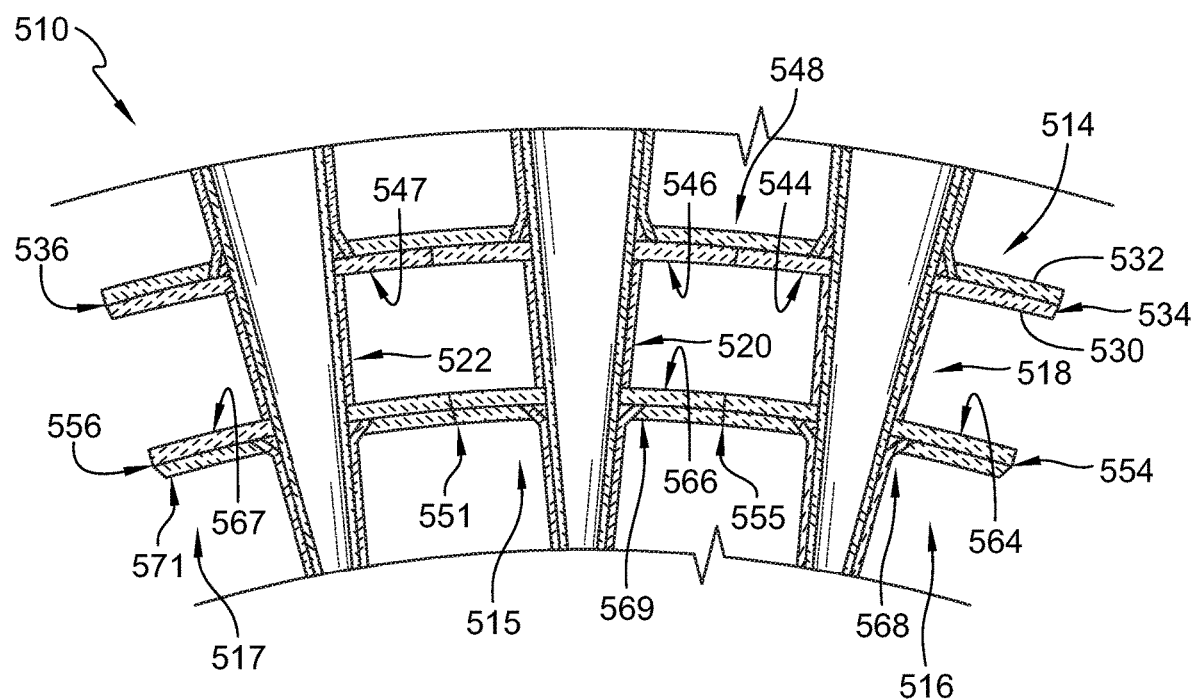
FIG. 12 is a section view of another turbine vane assembly made of ceramic matrix composite material for use in the gas turbine engine of FIG. 1 showing that the vane assembly includes three airfoils and further showing that each platform includes at least one ceramic layer arranged around the corresponding airfoil unit and a 2D sub-laminate layer that is pre-formed on the layer.

Another embodiment of a turbine vane assembly 510 in accordance with the present disclosure is shown in FIG. 12. The turbine vane assembly 510 is substantially similar to the turbine vane assembly 10 shown in FIGS. 1-5 and described herein. Accordingly, similar reference numbers in the 500 series indicate features that are common between the turbine vane assembly 10 and the turbine vane assembly 510. The description of the turbine vane assembly 10 is incorporated by reference to apply to the turbine vane assembly 510, except in instances when it conflicts with the specific description and the drawings of the turbine vane assembly 510.

The turbine vane assembly 510 includes a first platform 514, a second platform 516, a third platform 515, and a fourth platform 517 and at least three airfoils 518, 520, 522 as shown in FIG. 12. The first platform 514, second platform 516, the third platform 515, and the fourth platform 517 each extend circumferentially partway about an axis 11 of the gas turbine engine 110. The first platform 514 defines a first boundary of the gas path 21 of the turbine vane assembly 10, while the second, third, and fourth platform 516, 515, 517 are spaced apart radially from the first platform 514 to define a second boundary of the gas path 21. The third platform 515 is located adjacent the second platform along a first seam 555 and the fourth platform is located adjacent to the third platform along a second seam 551 as shown in FIG. 12.

The first platform 514 forms a radially inwardly facing surface 530, a radially outwardly facing surface 532, a first side wall 534, and a second side wall 536 as shown in FIG. 12. The radially inwardly facing surface 530 defines the first boundary of the gas path 21. The radially outwardly facing surface 532 is opposite the radially inwardly facing surface 530. The radially inwardly facing surface 530 and the radially outwardly facing surface 532 extend continuously circumferentially between the first side wall 534 and the second side wall 536. In the illustrative embodiment, the first airfoil unit 518 and the second airfoil unit 520 are located circumferentially between the first side wall 534 and the second side wall 536 of the first platform 514.

The first platform 514 includes a plurality of ceramic laminate layers having a first ceramic layer 544, a second ceramic layer 546, a third ceramic layer 547, and a 2D sub-laminate layer 548 as shown in FIG. 12. The first layer 544 is arranged around the first airfoil unit 518, the second layer 546 is arranged around the second airfoil unit 520, and the third layer 547 is arranged around the third airfoil unit 522. The 2D sub-laminate layer 548 is pre-formed on the first, second, and third layers 544, 546, 574 to couple the ceramic layers together.

In the illustrative embodiment, the second platform 516 extends circumferentially between a first side wall 554 and the first seam 555. The third platform 515 extends circumferentially between the first seam 555 and the second seam 551. The fourth platform extends circumferentially between the second seam 551 and a second side wall 556. The three airfoil units 518, 520, 522 are located circumferentially between the first side wall 554 and the second side wall 556.

The second platform 516 includes a plurality of ceramic laminate layers having a third ceramic layer 564 and a 2D sub-laminate layer 568 as shown in FIG. 12. The first layer 564 is arranged around the first airfoil unit 518. The 2D sub-laminate layer 568 is pre-formed on the third layer 564.

The third platform 515 includes a plurality of ceramic laminate layers having a fourth ceramic layer 566 and a 2D sub-laminate layer 569 as shown in FIG. 12. The fourth layer 566 is arranged around the second airfoil unit 520. The 2D sub-laminate layer 569 is pre-formed on the fourth layer 566.

The fourth platform 517 includes a plurality of ceramic laminate layers having a fifth ceramic layer 567 and a 2D sub-laminate layer 571 as shown in FIG. 12. The fifth layer 567 is arranged around the third airfoil unit 522. The 2D sub-laminate layer 571 is pre-formed on the fifth layer 567.

The present disclosure relates to ceramic matrix composite multi-vane construction, i.e. turbine vane doublets and/or turbine vane triplets as shown in FIGS. 2-11. In some embodiments, the construction of the turbine vane doublet 10, 210, 310 may be a two dimensional construction as shown in FIGS. 2-5 and 7-8. In other embodiments, the construction of the turbine vane doublet 10, 210, 310 may be a three dimensional construction as shown in FIG. 6. The three dimensional construction of the turbine vane doublet 210 may form the platform joint and an additional sub-laminate(s) platform element with cut-outs may be used as a hybrid two dimensional and three dimensional construction.

The use of such turbine vane doublets 10, 210, 310 and may result in a reduced part count within the gas turbine engine 110. In some embodiments, incorporating turbine vane doublets 10, 210, 310 may at least halve the number of ceramic matrix composite parts and wedge face seals between the turbine airfoils 18, 20, 218, 220, 318, 320.

The use of such turbine vane doublets 10, 210, 310 may result in greater control of the airfoil orientation relative to an adjacent airfoil. The construction of the turbine vane doublets 10, 210, 310 and turbine vane triplets 410, 510 may decrease the deflection between adjacent turbine vane assemblies within the turbine vane ring. The use of such turbine vane doublets 10, 210, 310 may eliminate leakage paths between adjacted airfoils 18, 20, 218, 220, 318, 320. The elimination of leakage may therefore reduce cooling air consumption.

The use of such turbine vane doublets 10, 210, 310 may also reduce thermal gradients and associated stresses in the turbine vane assemblies 10, 210, 310. In some embodiments, the use of such turbine vane doublets 10, 210, 310 may increase the structural rigidity and number of parts in tolerance stacks and reduce uncertainty at remaining wedge face gaps. In some embodiments, the use of such turbine vane doublets 10, 210, 310, may also reduce the weight and complexity of the support structure 12.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly adapted for use in a gas turbine engine, the turbine vane assembly comprising
    a first platform comprising ceramic matrix composite materials, the first platform extending circumferentially partway about an axis to define a first boundary of a gas path of the turbine vane assembly,
    a second platform comprising ceramic matrix composite materials, the second platform extending circumferentially partway about the axis to define a second boundary of the gas path and the second platform being spaced apart radially from the first platform,
    a first airfoil unit comprising ceramic matrix composite materials and adapted to interact with gases flowing through the gas path, the first airfoil unit extends radially relative to the axis between the first platform and the second platform,
    a second airfoil unit comprising ceramic matrix composite materials and adapted to interact with gases flowing through the gas path, the second airfoil unit extends radially relative to the axis between the first platform and the second platform, and the second airfoil unit being spaced apart circumferentially from the first airfoil unit,
    wherein the first platform, the second platform, the first airfoil unit, and the second airfoil unit are integrally formed as a single, one-piece component, and
    wherein the first platform includes a plurality of ceramic laminate layers and each of the plurality of ceramic laminate layers is formed to define a first airfoil unit-shaped hole that extends radially through the ceramic laminate layer and a second airfoil unit-shaped hole that extends radially through the ceramic laminate layer, the first airfoil unit extends radially through the first hole, and the second airfoil unit extends radially through the second hole,
    wherein the first airfoil unit includes a vane core and a locking layup, the vane core extends radially through the first platform and the second platform, the locking layup includes a filler coupled with the vane core and aligned radially with the first platform and a core overwrap that extends radially along the vane core from a tip of the vane core toward the first platform and extends along the filler to cause the core overwrap to flare away from the vane core and engage the first platform.

2. The turbine vane assembly of claim 1, wherein the first platform includes a radially inwardly facing surface that defines the first boundary of the gas path and a radially outwardly facing surface opposite the radially inwardly facing surface, the radially inwardly facing surface and the radially outwardly facing surface of the first platform extend continuously circumferentially between a first side wall and a second side wall of the first platform, and the first airfoil unit and the second airfoil unit are located circumferentially between the first side wall and the second side wall of the first platform.

3. The turbine vane assembly of claim 2, further comprising a third platform spaced apart radially from the first platform, the second platform is arranged circumferentially and axially about the first airfoil unit and integrally formed with the first airfoil unit, the third platform is arranged circumferentially and axially about the second airfoil unit and integrally formed with the second airfoil unit, and the third platform is located adjacent the second platform along a seam.

4. The turbine vane assembly of claim 2, wherein the second platform includes a radially outwardly facing surface that defines the second boundary of the gas path and a radially inwardly facing surface opposite the radially outwardly facing surface, the radially inwardly facing surface and the radially outwardly facing surface of the second platform extend continuously circumferentially between a first side wall and a second side wall of the second platform, and the first airfoil unit and the second airfoil unit are located circumferentially between the first side wall and the second side wall of the second platform.

5. The turbine vane assembly of claim 1, wherein the first airfoil unit includes an airfoil body located radially between the first platform and the second platform and arranged around the vane core.

6. The turbine vane assembly of claim 1, wherein the first platform includes a first 3D woven ceramic structure arranged around the first airfoil unit and a 2D sub-laminate layer of ceramic materials pre-formed on the first 3D woven ceramic structure.

7. The turbine vane assembly of claim 6, wherein the first platform includes a second 3D woven ceramic structure arranged around the second airfoil unit and the 2D sub-laminate layer of ceramic materials is pre-formed on the first and second 3D woven ceramic structures to couple the first 3D woven ceramic structure with the second 3D woven ceramic structure.

8. A turbine vane assembly adapted for use in a gas turbine engine, the turbine vane assembly comprising
    a first platform comprising ceramic matrix composite materials, the first platform extending circumferentially partway about an axis between a first side wall and a second side wall to define a boundary of a gas path of the turbine vane assembly,
a first airfoil unit comprising ceramic matrix composite materials and coupled with the first platform between the first side wall and the second side wall, and
a second airfoil unit comprising ceramic matrix composite materials and coupled with the first platform between the first side wall and the second side wall, the second airfoil unit being spaced apart circumferentially from the first airfoil unit,
wherein the first platform, the first airfoil unit, and the second airfoil unit are integrally formed as a single, one-piece component and
wherein the first platform includes a plurality of ceramic laminate layers and each of the plurality of ceramic laminate layers is formed to define a first hole that extends radially through the ceramic laminate layer and a second hole that extends radially through the ceramic laminate layer, the first airfoil unit extends radially through the first hole, the second airfoil unit extends radially through the second hole, wherein the first airfoil unit includes a vane core and a locking layup, the vane core extends radially through the first platform, the locking layup includes a filler coupled with the vane core and aligned radially with the first platform and a core overwrap that extends radially along the vane core from a tip of the vane core toward the first platform and extends along the filler to cause the core overwrap to flare away from the vane core and engage the first platform.

9. The turbine vane assembly of claim 8, further comprising a second platform comprising ceramic matrix composite materials, the second platform is spaced apart radially from the first platform, and the second platform is coupled with and integrally formed with the first airfoil unit.

10. The turbine vane assembly of claim 9, wherein the second platform is coupled with and integrally formed with the second airfoil unit.

11. The turbine vane assembly of claim 9, further comprising a third platform comprising ceramic matrix composite materials, the third platform is spaced apart radially from the first platform, and the third platform is coupled with and integrally formed with the second airfoil unit.

12. The turbine vane assembly of claim 8, wherein the first platform includes a first ceramic laminate layer arranged around the first airfoil unit, a second ceramic laminate layer arranged around the second airfoil unit, and a third ceramic laminate layer arranged around the first airfoil unit and the second airfoil unit and layered on the first ceramic laminate layer and the second ceramic laminate layer.

13. The turbine vane assembly of claim 8, wherein the first platform includes a first 3D woven ceramic structure arranged around the first airfoil unit and a 2D sub-laminate layer of ceramic materials pre-formed on the first 3D woven ceramic structure.

14. The turbine vane assembly of claim 13, wherein the first platform includes a second 3D woven ceramic structure arranged around the second airfoil unit and the 2D sub-laminate layer of ceramic materials is pre-formed on the first and second 3D woven ceramic structures to couple the first 3D woven ceramic structure with the second 3D woven ceramic structure.

15. A method comprising
providing a first platform comprising ceramic matrix composite materials that extends circumferentially partway about an axis, a second platform comprising ceramic matrix composite materials that extends circumferentially partway about the axis, a first airfoil unit comprising ceramic matrix composite materials, and a second airfoil unit comprising ceramic matrix composite materials,
arranging a portion of the first airfoil unit through a first airfoil unit-shaped hole formed in the first platform and a portion of the second airfoil unit through a second airfoil unit-shaped hole formed in the first platform to couple the first platform with the first airfoil unit and the second airfoil unit,
arranging another portion of the first airfoil unit through a first airfoil unit-shaped hole formed in the second platform and another portion of the second airfoil unit through a second airfoil unit-shaped hole formed in the second platform to couple the second platform with the first airfoil unit and the second airfoil unit, and
infiltrating the first platform, the second platform, the first airfoil unit, and the second airfoil unit with ceramic matrix composite material to form an integral, single piece component,
wherein the first platform and the second platform each include a first 3D woven ceramic structure, a second 3D woven ceramic structure, and a 2D sub-laminate layer of ceramic materials, and wherein the method further includes arranging the first 3D woven ceramic structure around the first airfoil unit, arranging the second 3D woven ceramic structure around the second airfoil unit, and pre-forming the 2D sub-laminate layer of ceramic materials on the first and second 3D woven ceramic structures to couple the first 3D woven ceramic structure with the second 3D woven ceramic structure
wherein the first airfoil unit and second airfoil unit each include a vane core and a locking layup, the vane core extends radially through the first platform and the second platform, the locking layup includes a filler coupled with the vane core and aligned radially with one of the first platform and the second platform and a core overwrap that extends radially along the vane core from a tip of the vane core toward one of the first platform and the second platform and extends along the filler to cause the core overwrap to flare away from the vane core and engage one of the first platform and the second platform.

* * * * *